Sept. 11, 1962  S. W. HAYES  3,053,200
BUMPING POST
Filed May 24, 1954  13 Sheets-Sheet 1
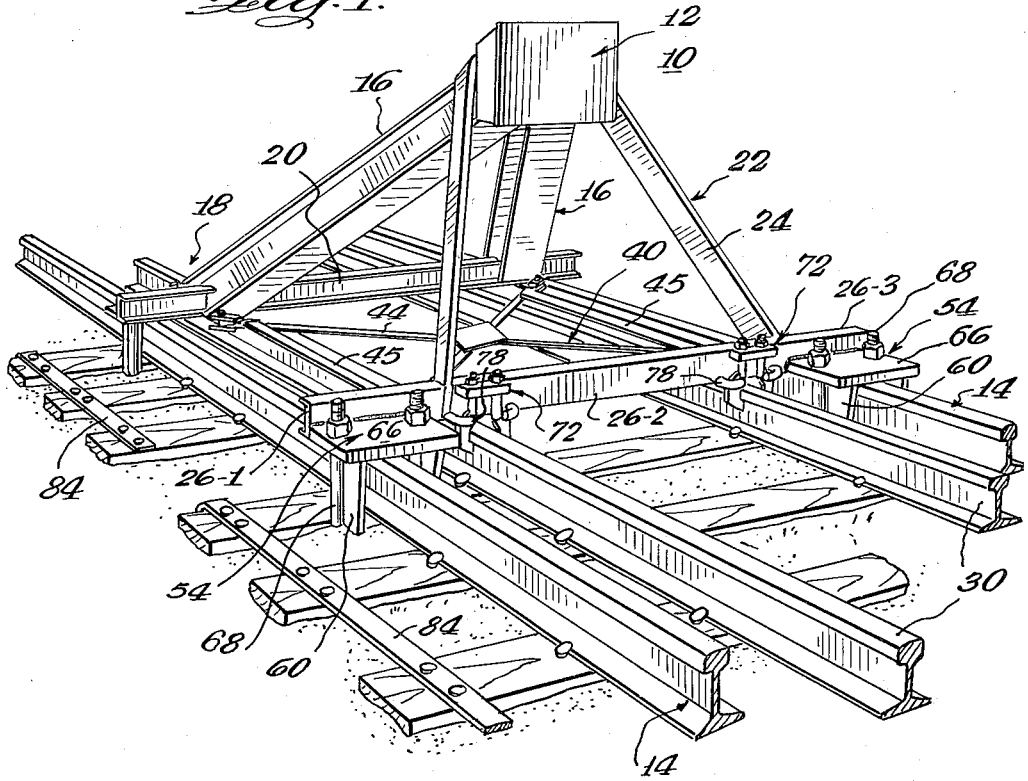
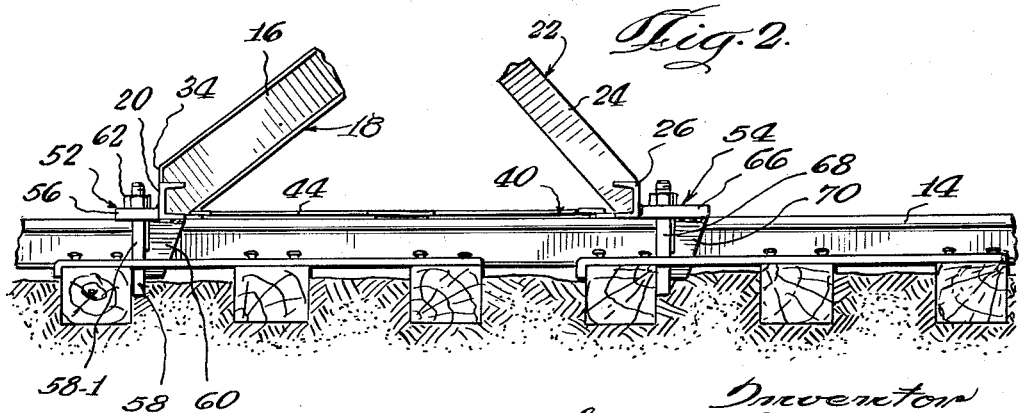
Inventor
Stanley W. Hayes
By Mason, Kolehmainen, Rathburn & Wyss
Attorneys

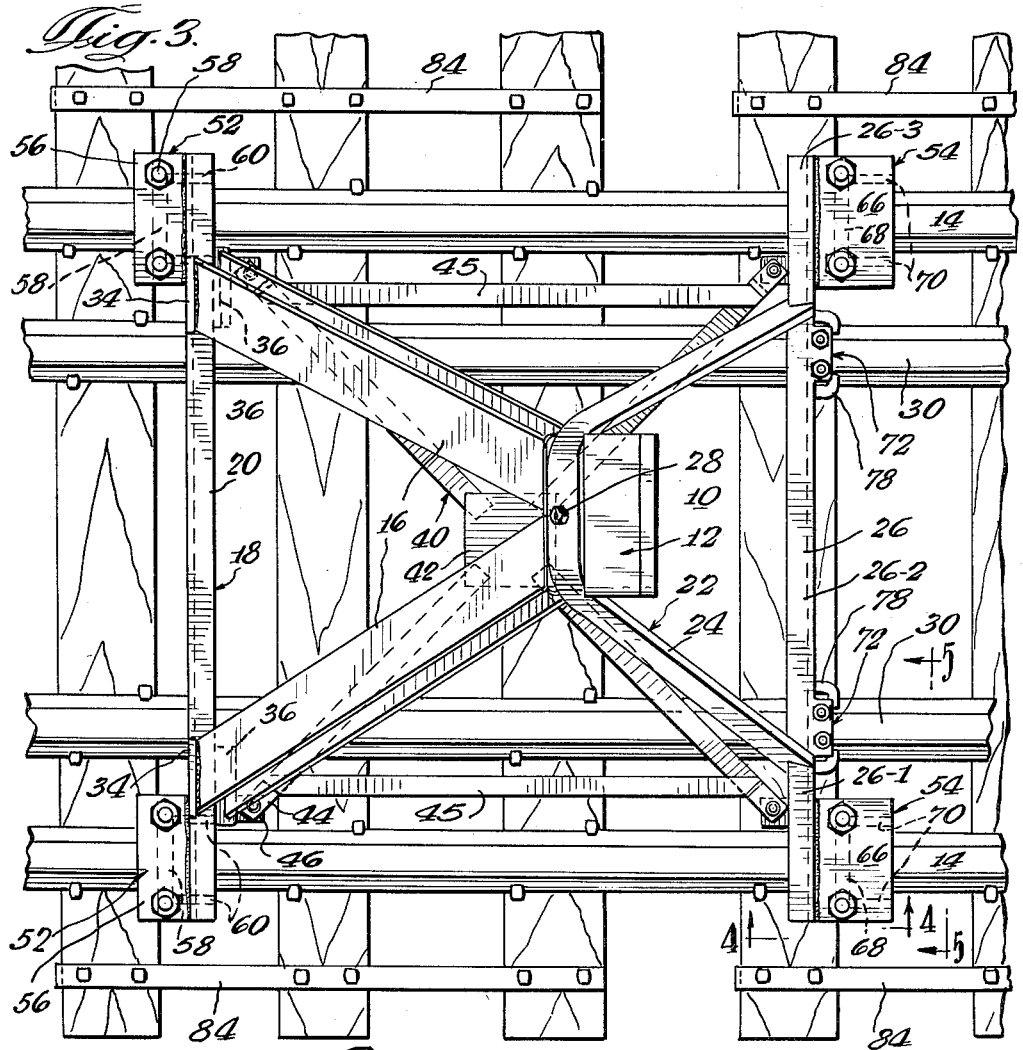
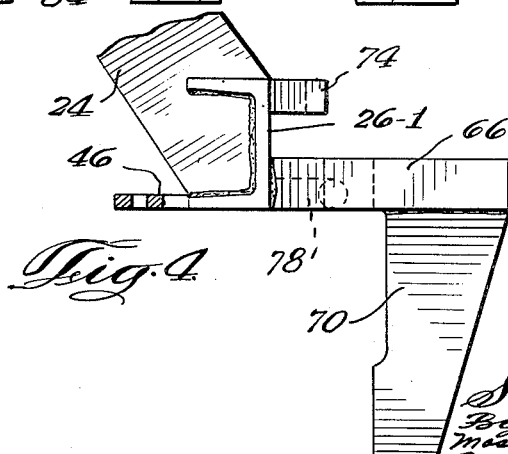

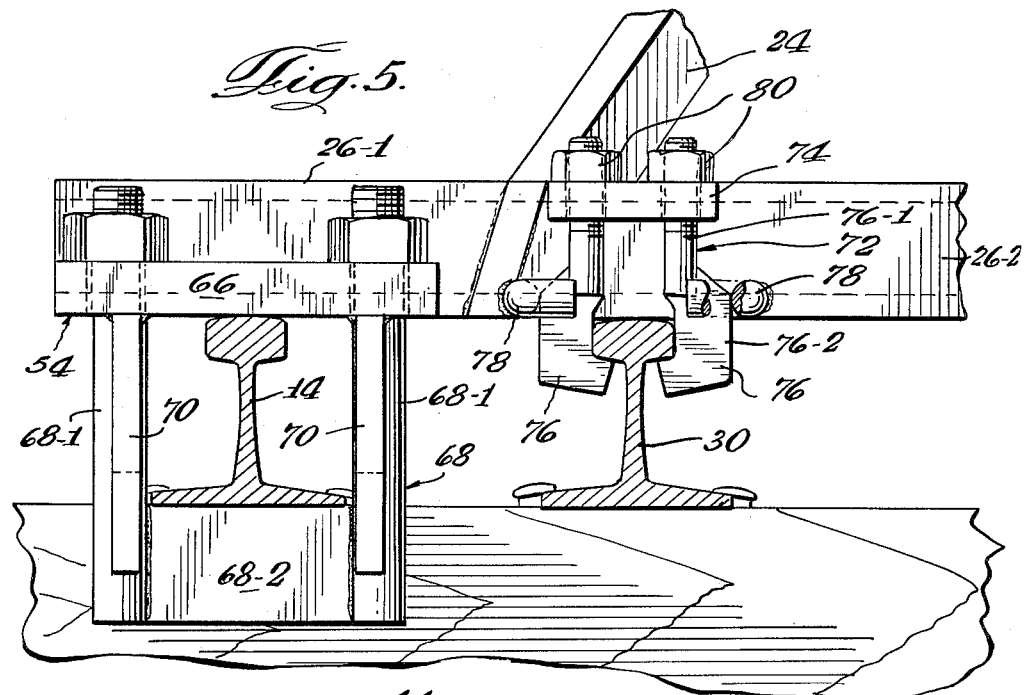
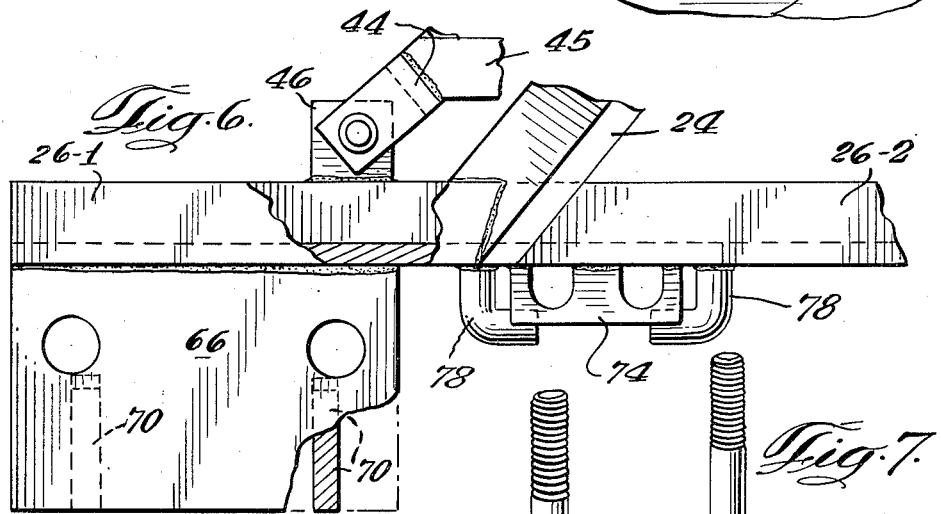
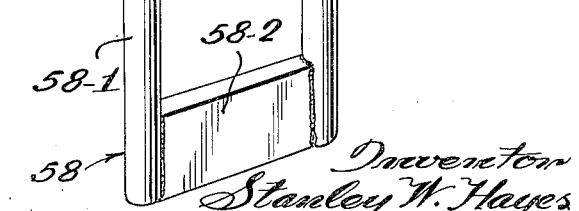

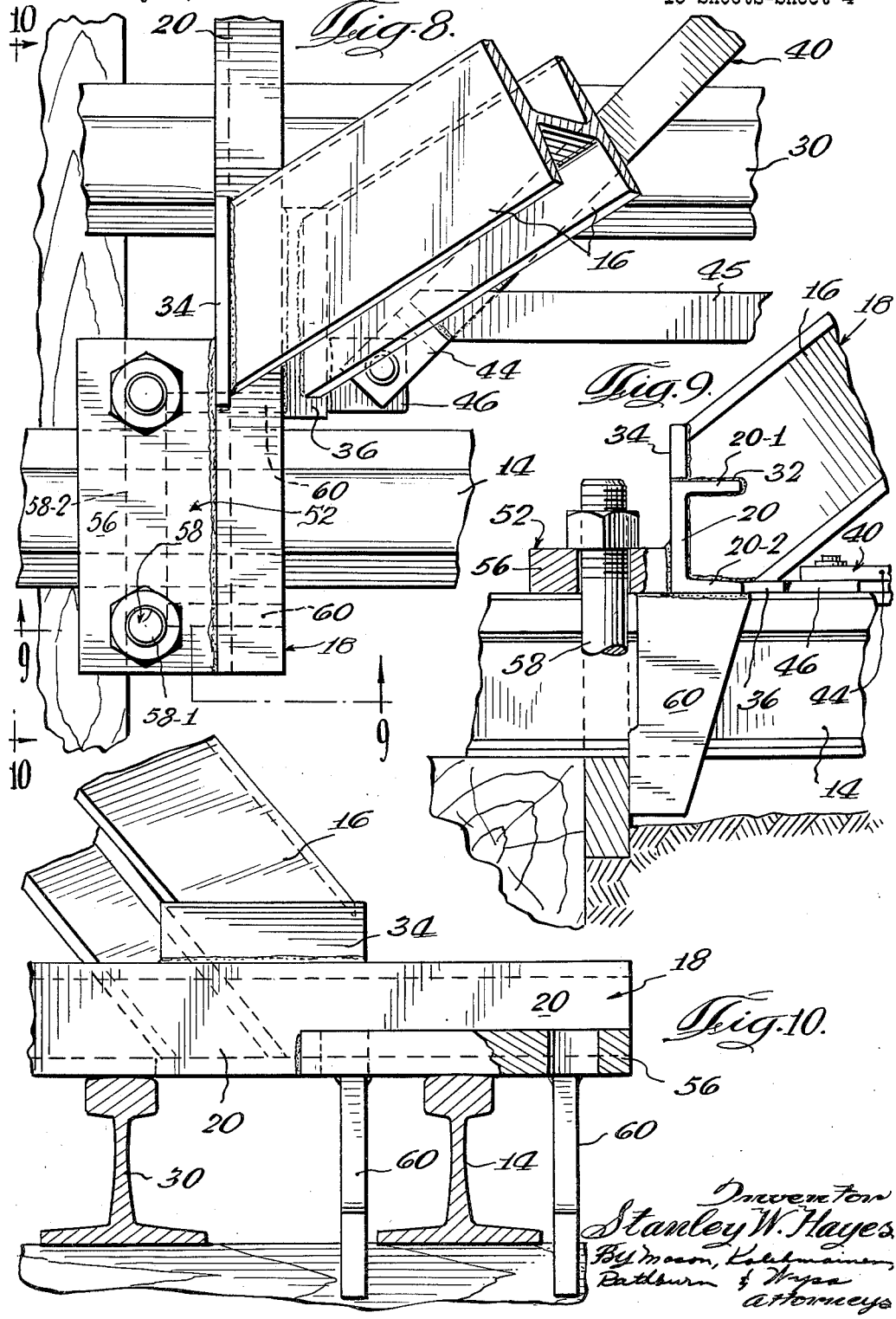

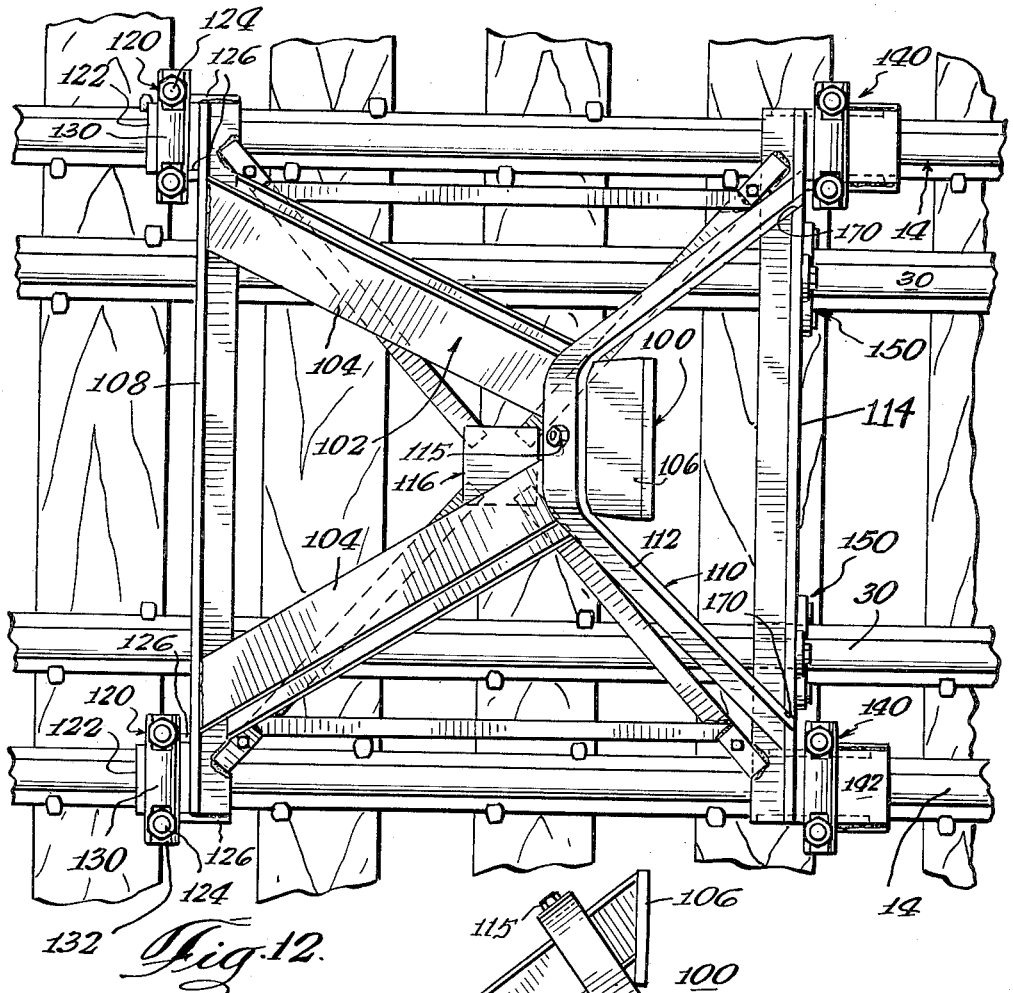

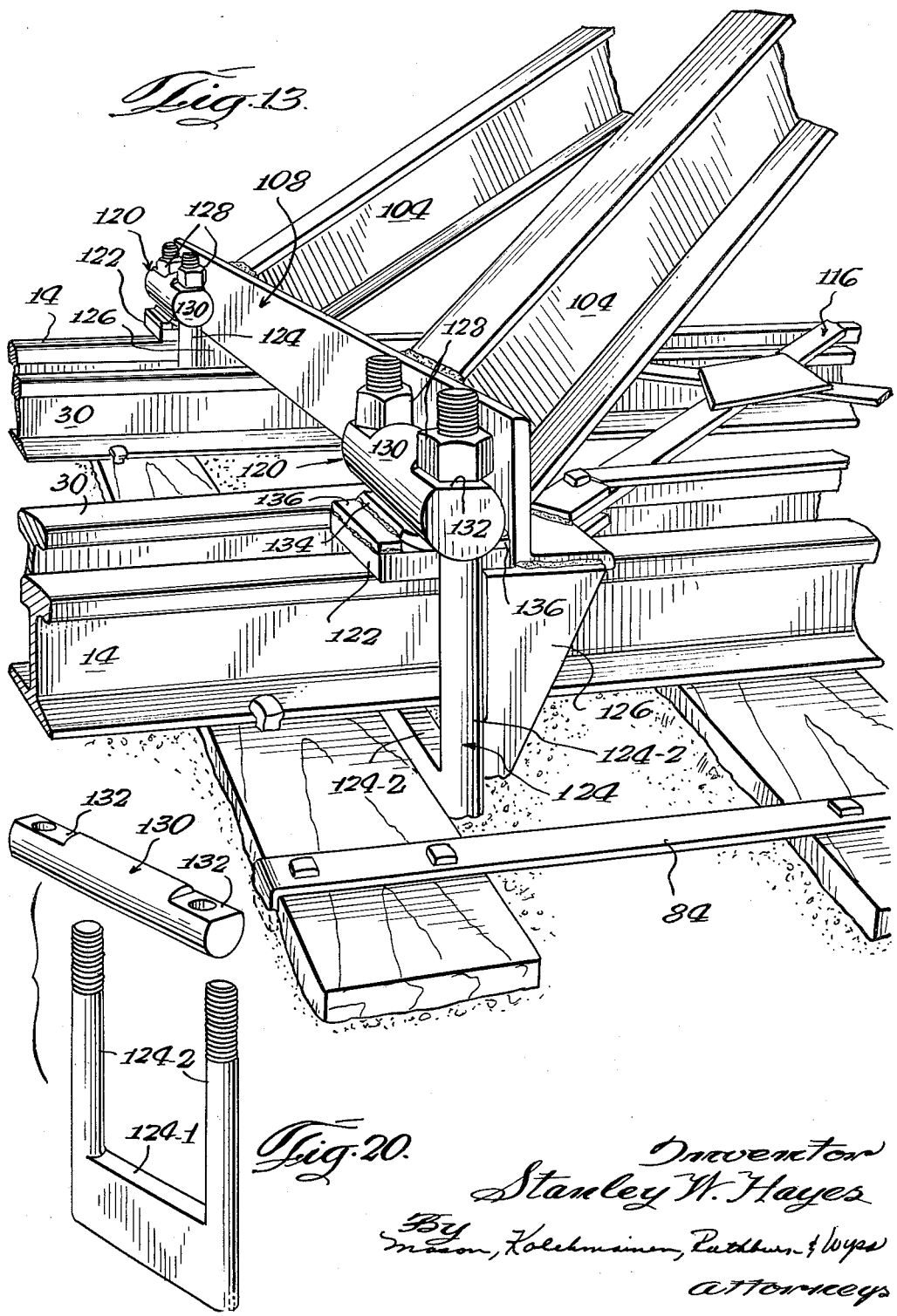

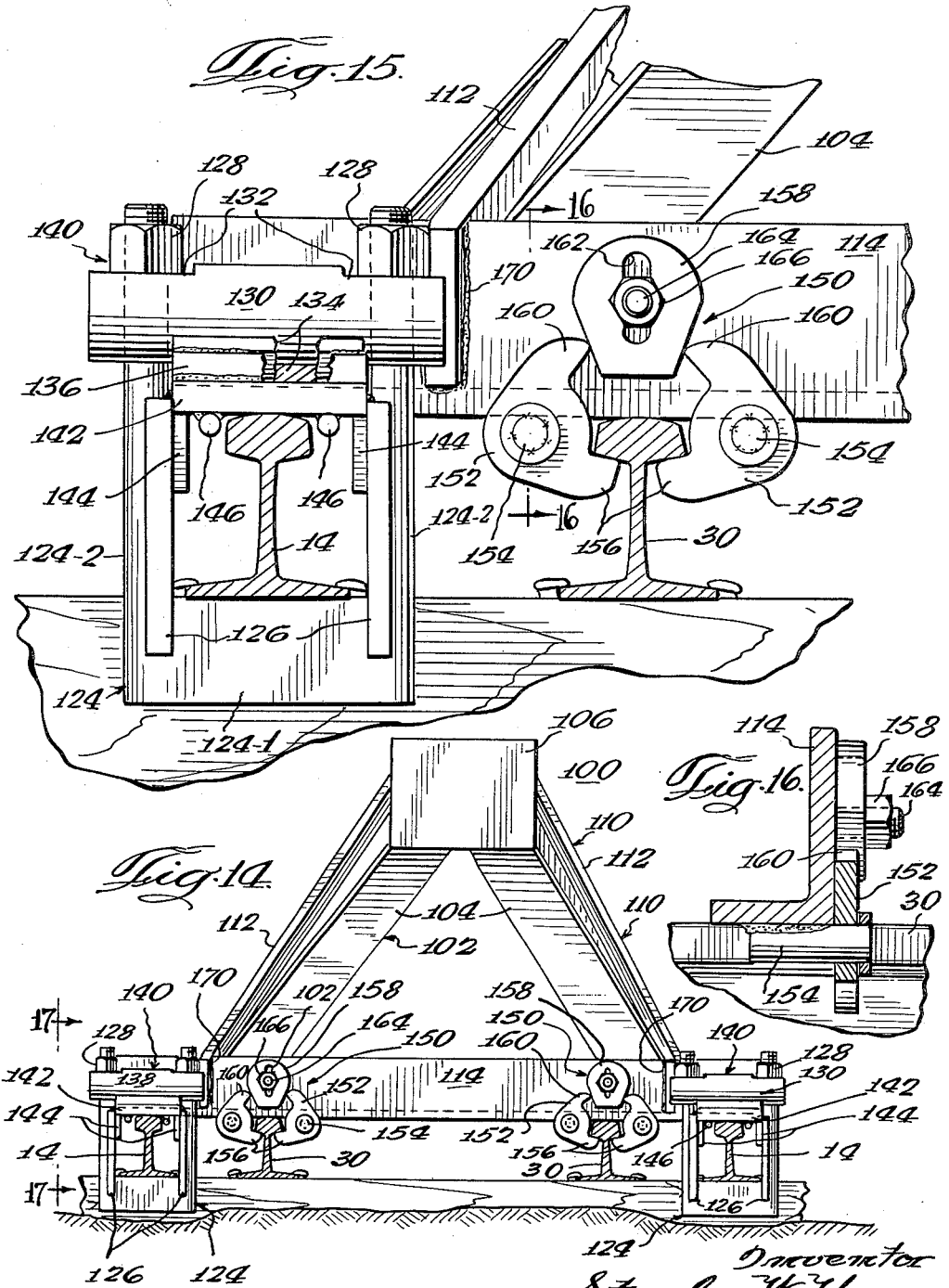

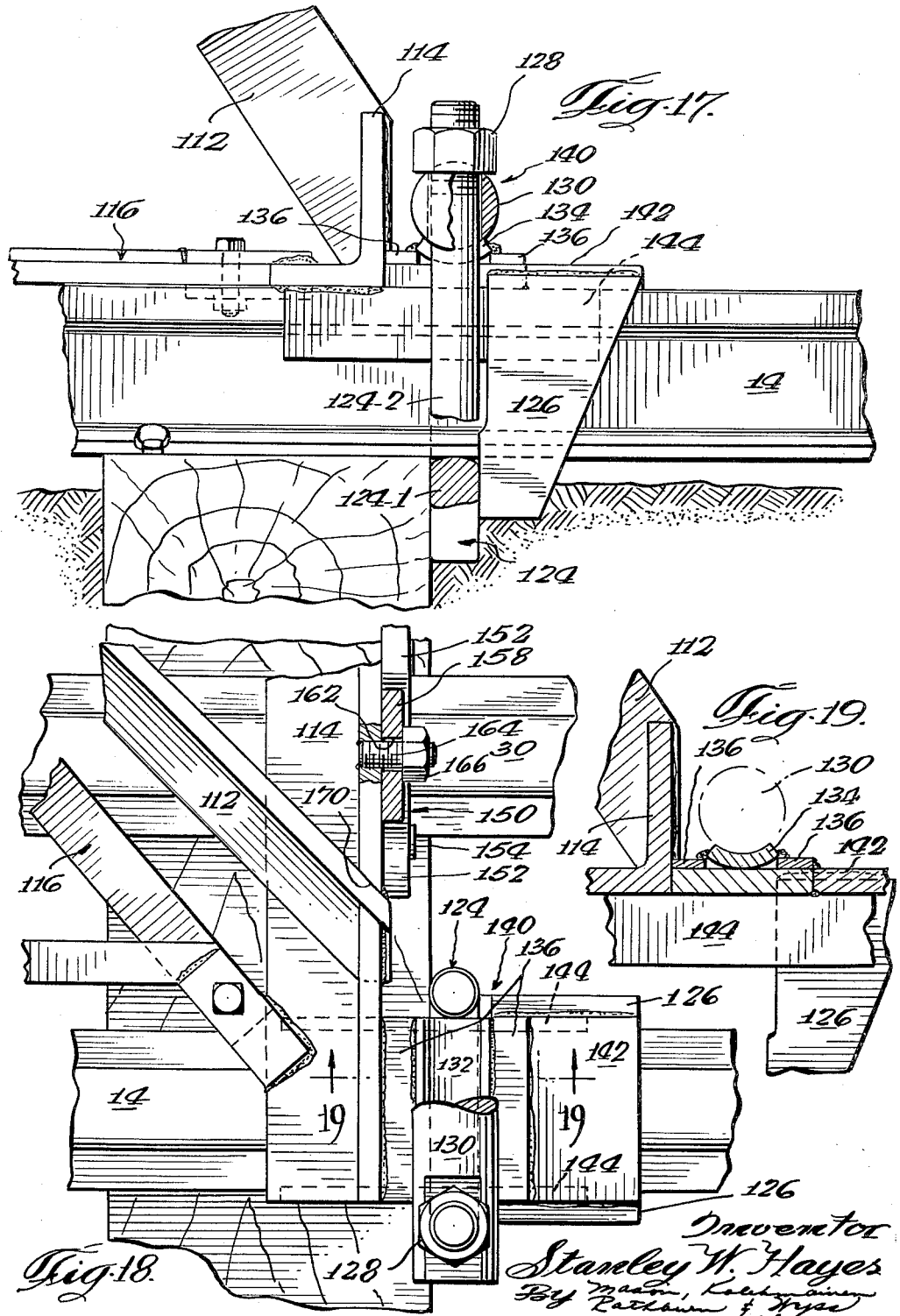

Sept. 11, 1962
S. W. HAYES
3,053,200
BUMPING POST
Filed May 24, 1954
13 Sheets-Sheet 9
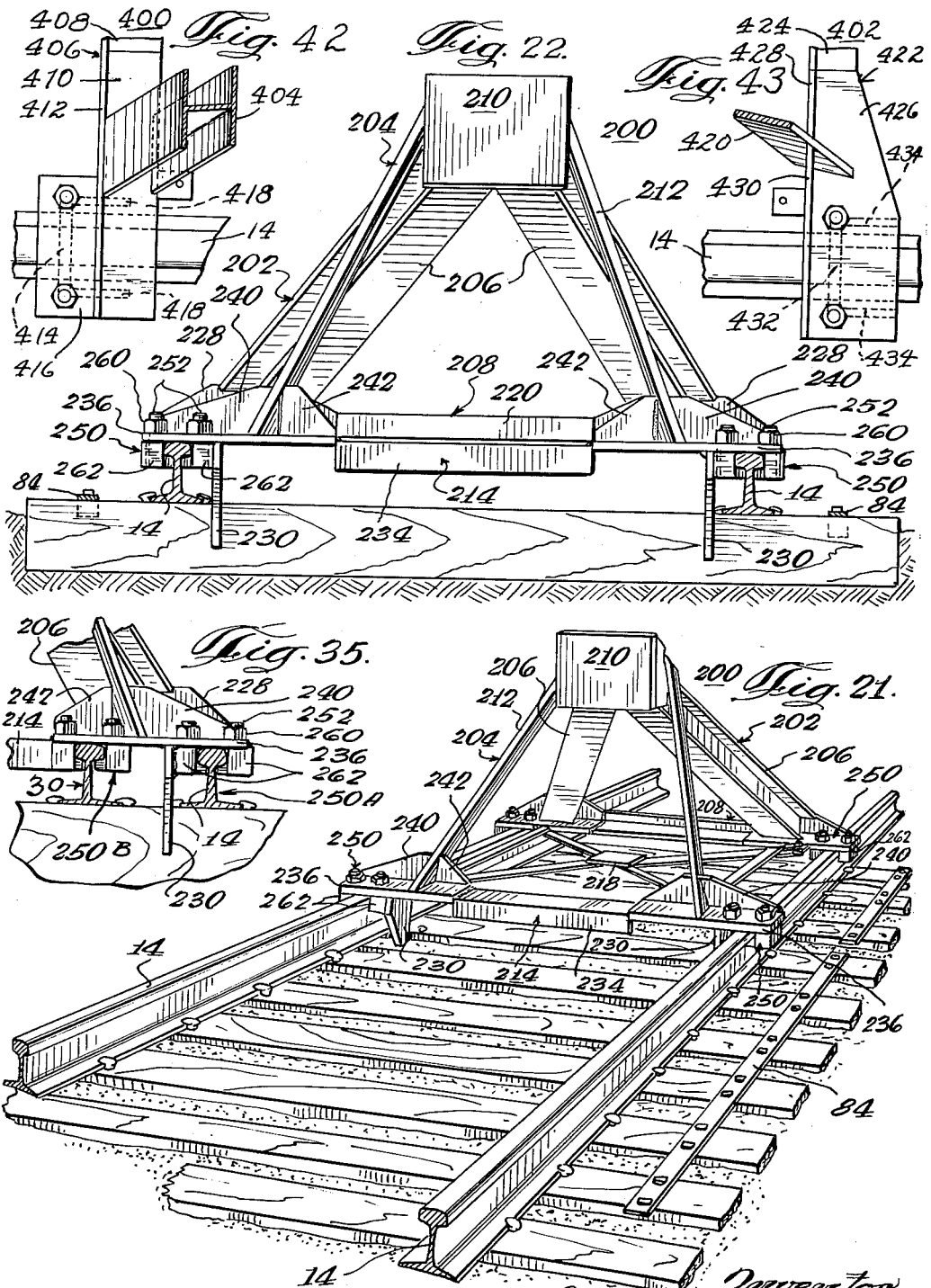

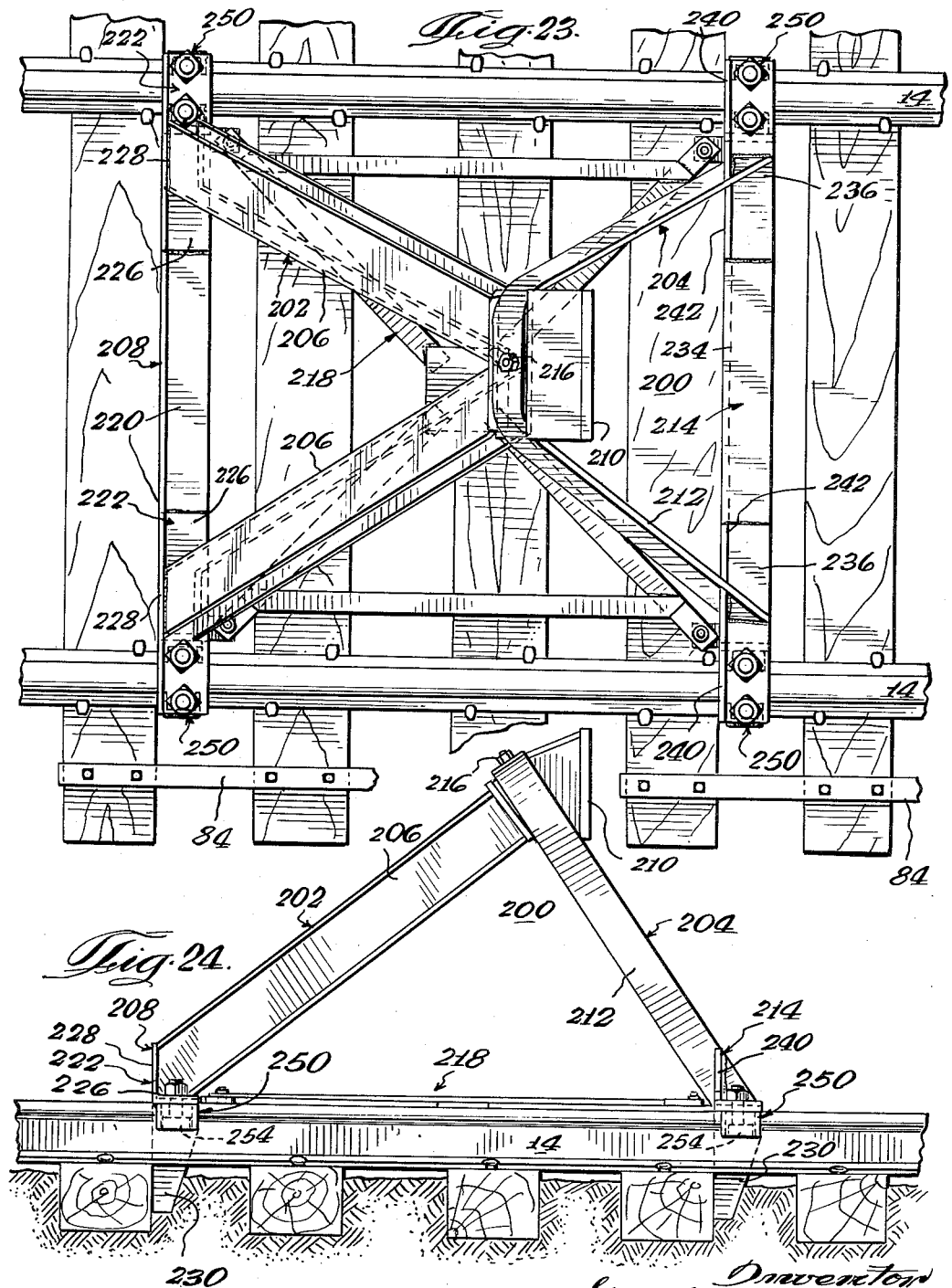

Sept. 11, 1962
S. W. HAYES
3,053,200
BUMPING POST
Filed May 24, 1954
13 Sheets-Sheet 11
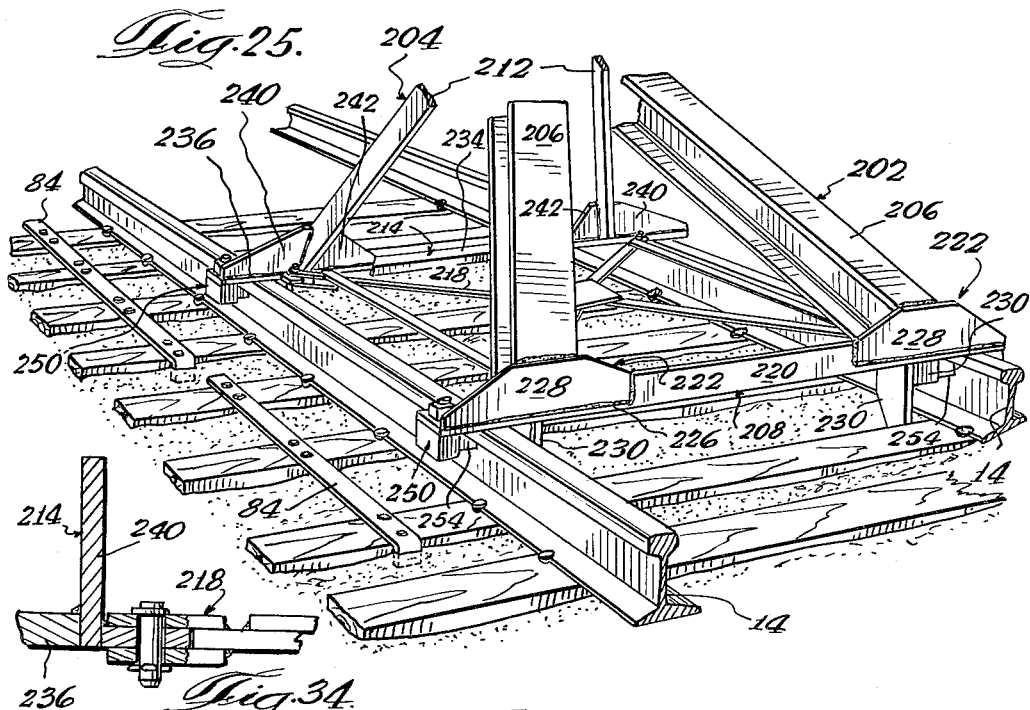
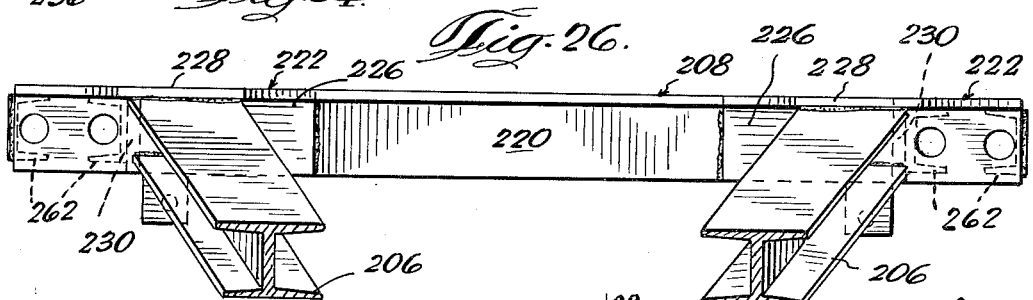
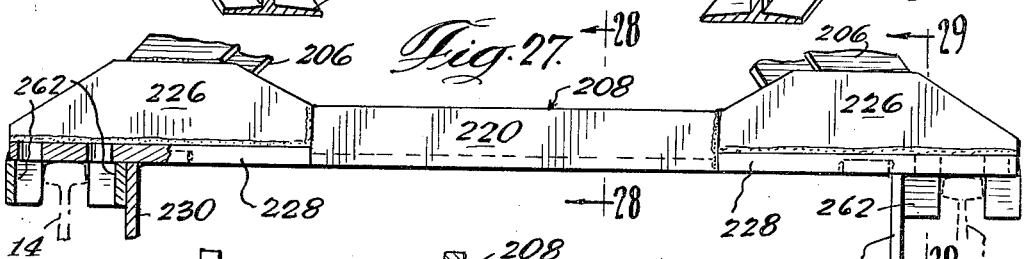
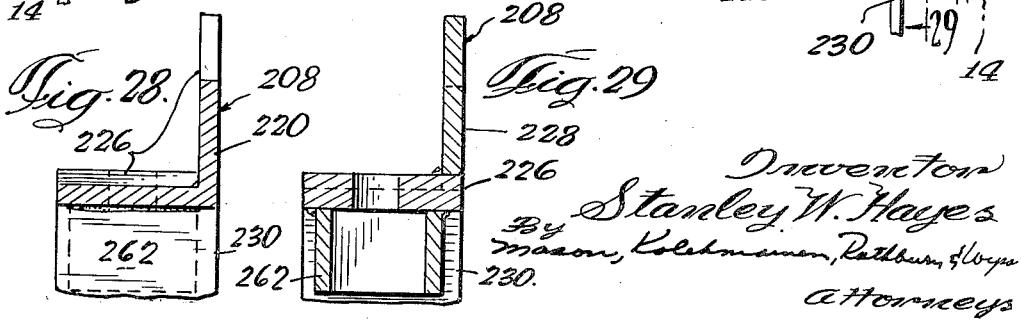

Sept. 11, 1962
S. W. HAYES
3,053,200
BUMPING POST
Filed May 24, 1954
13 Sheets-Sheet 12
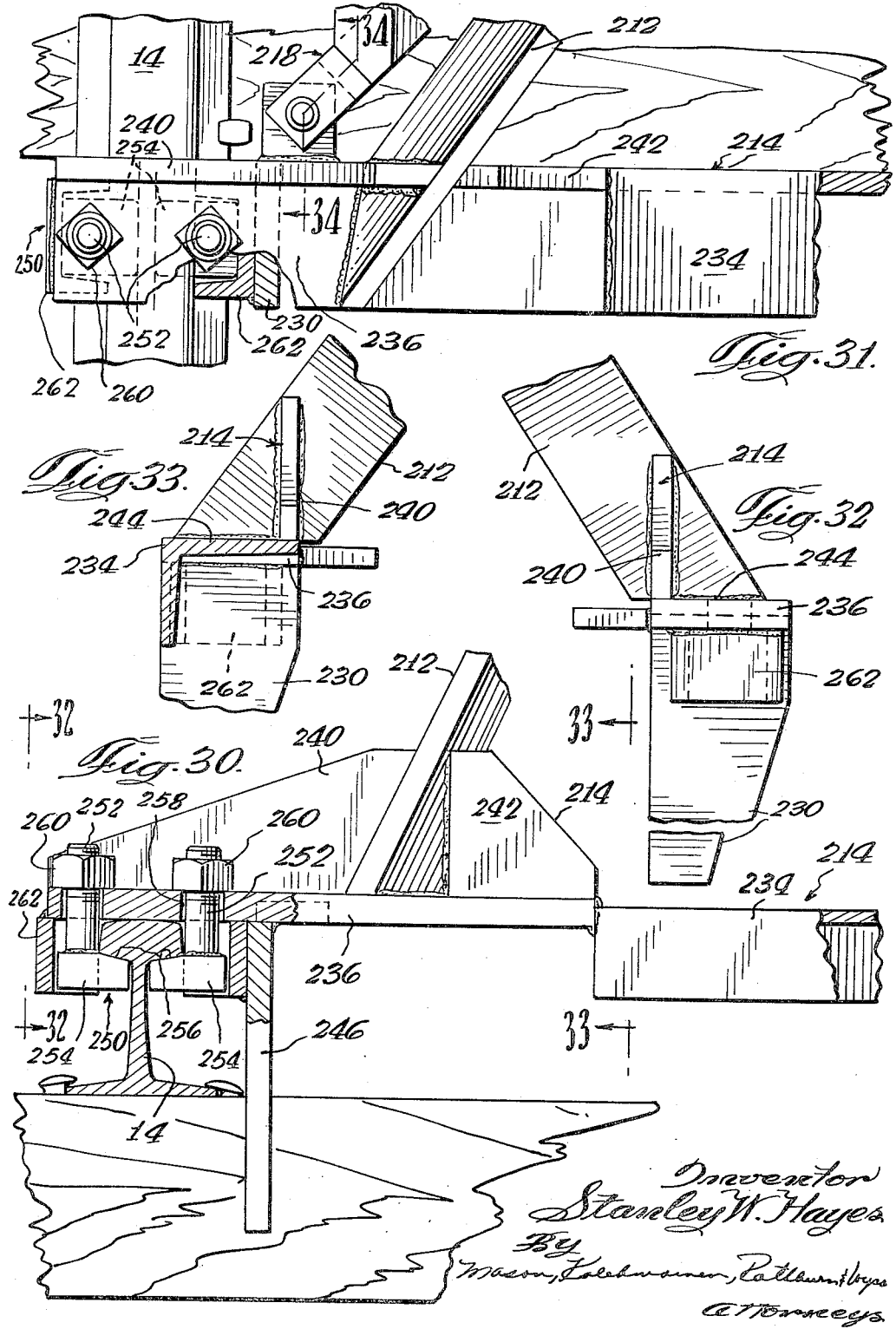
Inventor
Stanley W. Hayes
By
Mason, Kolehmainen, Rathburn & Wyss
Attorneys

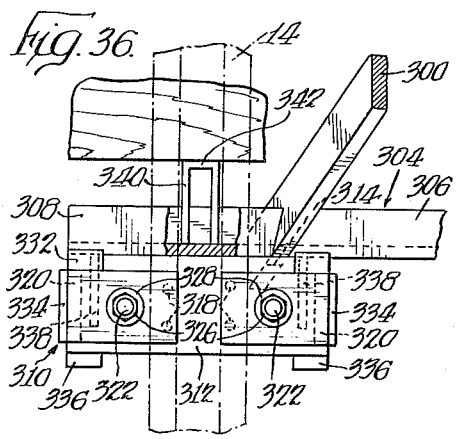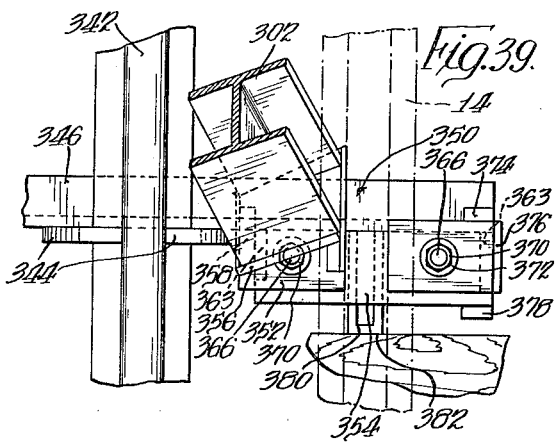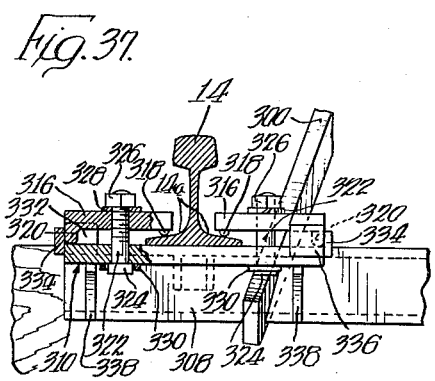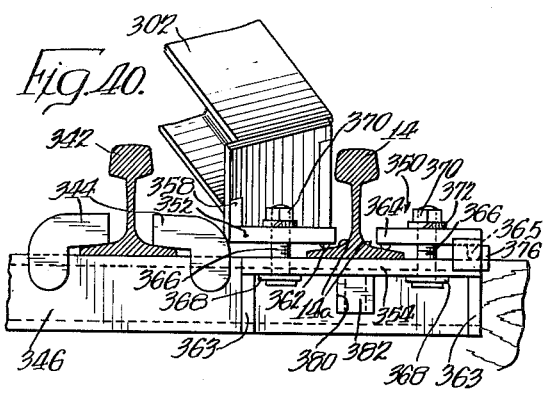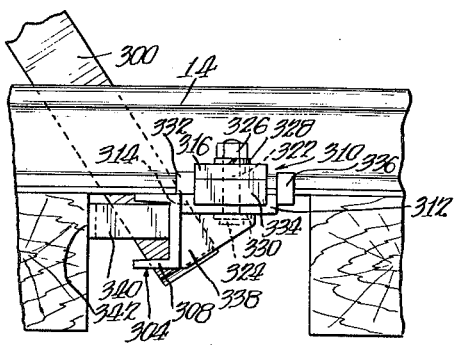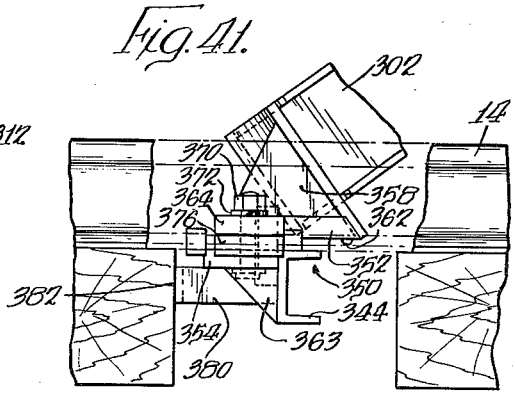

3,053,200
BUMPING POST
Stanley W. Hayes, Wayne Township, near Richmond, Ind., assignor to Hayes Track Appliance Company, Richmond, Ind., a corporation of Indiana
Filed May 24, 1954, Ser. No. 431,978
18 Claims. (Cl. 104—254)

The present invention relates to improvements in bumping posts and particularly bumping posts of the type in which a bumper head located substantially centrally between the rails is supported above the rail by tension and compression means. This application is a continuation-in-part of application Serial No. 333,670, filed January 8, 1953, now abandoned, and assigned to the assignee of this application.

The primary object of the present invention is the provision of a new and improved bumping post which may be considered as being of a cushion type and in which the forces of impact are transmitted in the main to the road bed in such manner that there is no damage to the car or lading or to the post itself.

A further object of the present invention is the provision of a new and improved bumping post which is adapted easily to be mounted upon the rails for longitudinal movement along the rails and which is provided with structure extending below the rails into abutting relation with the ties so that the forces of impact occurring when the bumping post is struck by a moving car or the like are transmitted to the road bed thereby to provide a cushion stop of the car.

Another object of the present invention is the provision of a new and improved bumping post with joint structures by means of which it is supported by and upon the rails so as to permit the post to move under car wheel impact and with impact transmitting structures abutting against the ties in the region of each joint structure.

A further object of the present invention is the provision of a new and improved bumping post of the cushion type wherein the post is effectively seated upon the rail heads by compression and tension cross members and the joint structures include means encircling all or part of the rail and the impact transmitting structures depend down below the bases of the rails and both structures are effectively secured to the cross members.

A still further object of the present invention is the provision of a new and improved bumping post of the cushion type including structure insuring uniform movement of both the compression and tension unit structures whereby buckling of the post is avoided.

Another object of the present invention is to provide the bumping post with associated structures whereby the movement of the post may be regulated in a simple but effective manner.

A further object of the invention is the provision of a new and improved bumping post which may readily be installed either as a fixed or movable post.

Track end appliances of various types have heretofore been provided for stopping cars. Some of these appliances engage the wheels of the car and are commonly called wheel stops. Other appliances engage the couplings and are commonly called bumping posts. The present invention relates to bumping posts and it brings into the art a novel concept. This concept is that of mounting the bumping post for sliding movement along the rails and providing the post with structure extending down into the ballast and abutting against the ties. As a result of the movable mounting and the use of the structures extending into the road bed, the force of impact occurring when the bumping post is struck by a car is transmitted to the ties and ballast. As a result, the road bed provides what may be considered to be a cushion stopping of the car. It has been found that bumping posts constructed in accordance with the present invention operate in a very efficient manner.

In brief, the bumping post of the present invention includes a tension member extending downwardly, forwardly and divergently outward from the bumping head toward adjacent rails. It includes, also, a compression member, which is somewhat heavier than the tension member, diverging downwardly, outwardly and rearwardly. Both the tension and compression members are connected at their lower ends to cross members, which may take various forms, and which are preferably adapted to be seated on the upper surfaces of the rail heads. Each of the tension and compression cross members has associated therewith means for slidably supporting and guiding the same upon the rail. Each also includes impact transmitting structure extending below the base of the rail into abutting relation to a cross tie normally used in supporting the rail whereby the impact is transmitted to the road bed. The impact transmitting structure may take various forms as may the means for slidably supporting the cross pieces on the rails. In one arrangement, loops are passed around the rails and these are associated with structures maintaining the loops vertical so that they will not bind as the bumping post is moved along the rail under car impact. In one arrangement, the loops are constructed so as to be supported on arcuate bearing surfaces and the structures maintaining them vertical may be removed or not installed whereby the slidable structure can readily be transformed into a substantially rigid one, the rigidity being provided by the binding action of the loop. In another and presently preferred embodiment, the means supporting the bumping post for sliding movement is constructed and arranged to encircle or embrace the rail head thereby to provide what might be considered to be a rail head clamp type of structure. The supporting means may also be associated with the rail base flanges. The posts of the present invention also include structures interconnecting the four joint structures thereby further to insure uniform movement of the joints to prevent buckling of the post. Also, compression and tension anchor bars are used, with tension anchor bars secured to a greater number of ties than the compression anchor bars, thereby additionally to prevent buckling resulting from possible greater movement of the tension unit than of the compression unit.

Other objects and advantages of the present invention will become apparent from the ensuing description of various embodiments of the invention in the course of which reference is had to the accompanying drawings in which:

FIG. 1 is a perspective view showing a first embodiment of the bumping post of the present invention installed upon a railroad track;

FIG. 2 is a fragmentary side view of the bumping post shown in FIG. 1;

FIG. 3 is a top plan view of the bumping post;

FIG. 4 is an enlarged side elevational view of a portion of a tension joint structure taken along the line 4—4 of FIG. 3 with the rail, the rail supporting tie and the rail encircling loop omitted;

FIG. 5 is an enlarged fragmentary front elevational view of one of the tension joint structures and associated post supporting and guiding means, the view being taken along the line 5—5 of FIG. 3;

FIG. 6 is a top plan view, partly broken away and with certain elements omitted, of the structure illustrated in FIG. 5;

FIG. 7 is a perspective view of the rail encircling clamp shown in FIG. 5;

FIG. 8 is an enlarged fragmentary top elevational view illustrating details of one of the compression joint structures and associated post holding and guiding means;

FIG. 9 is a side elevational view of the structure shown in FIG. 8, the view being taken primarily along the broken line 9—9 of FIG. 8;

FIG. 10 is an end elevational view of the structure shown in FIG. 9, the view being taken generally along the line 10—10 of FIG. 9 and being partly broken away and with certain parts omitted;

FIG. 11 is a side elevational view of a second embodiment of the bumping post, the anchor bars being omitted;

FIG. 12 is a top elevational view of the bumping post shown in FIG. 11;

FIG. 13 is an enlarged perspective view of the compression end of the post illustrating particularly one of the compression joint structures and associated holding and guiding structures;

FIG. 14 is a front elevational view of the bumping post shown in FIG. 11;

FIG. 15 is an enlarged fragmentary and partly broken away front elevational view illustrating particularly details of one of the tension joint structures and associated holding and guiding means;

FIG. 16 is a vertical cross sectional view taken along the line 16—16 of FIG. 15;

FIG. 17 is an enlarged fragmentary side elevational view, partly broken away, of one of the tension joint structures and associated post holding and guiding means, the view being taken in the direction of line 17—17 of FIG. 14;

FIG. 18 is a fragmentary and partly broken away top elevational view of the structure illustrated in FIG. 17;

FIG. 19 is a vertical cross sectional view taken along the line 19—19 of FIG. 18;

FIG. 20 is an exploded perspective view illustrating one of the rail encircling loops utilized in the second embodiment of the invention;

FIG. 21 is a perspective view of a third embodiment of the invention;

FIGS. 22, 23 and 24 are front elevational, plan and side elevational views of the third embodiment;

FIG. 25 is a fragmentary perspective view of the bumping post looking at it from the rear;

FIG. 26 is a fragmentary top elevational view primarily of the compression cross member and compression joint structure;

FIG. 27 is a rear elevational view of the same;

FIGS. 28 and 29 are vertical cross sectional views taken along the lines 28—28 and 29—29 of FIG. 27;

FIG. 30 is a fragmentary front elevational view, partly broken away, of one of the tension joint structures and associated holding and guiding means;

FIG. 31 is a top elevational view, partly broken away, of the structure shown in FIG. 30;

FIG. 32 is a side elevational thereof, the view being along the line 32—32 of FIG. 30;

FIG. 33 is a vertical cross sectional view taken along the line 33—33 of FIG. 30;

FIG. 34 is a vertical cross sectional view taken along the broken line 34—34 of FIG. 31;

FIG. 35 is a fragmentary front elevational view of a modification of the last embodiment utilizing two head clamps at each tension joint, the second embracing the head of an auxiliary rail;

FIG. 36 is a fragmentary plan view, partly broken away, of a left tension joint and associated holding and guiding means of a further embodiment of the invention;

FIG. 37 is a front elevation of the same, partly broken away;

FIG. 38 is a side elevational view of the same;

FIGS. 39, 40 and 41 are views similar to FIGS. 36, 37 and 38 of the right compression joint structure and associated holding and guiding means; and FIGS. 42 and 43 are fragmentary plan views of left compression and tension joints and associated holding and guiding means of a still further embodiment of the invention.

Referring now to the drawings and first particularly to FIGS. 1 to 10, inclusive, illustrating the first embodiment of the invention, it may be seen that the bumping post, which is indicated as a whole generally by the reference character 10, comprises a bumper head 12 supported slightly off center with respect to a pair of cross tie supported rails 14 by a pair of compression members 16 and forming a part of a compression unit indicated as a whole by reference character 18, including also a compression cross member 20, and a tension unit indicated as a whole by reference character 22 and comprising a one piece tension bar 24 and a tension cross member 26. The compression members 16 diverge outwardly, downwardly and rearwardly from the bumper head 12 to the compression cross piece to which they are joined in a manner to be described hereinafter. The tension bar 24 is generally V-shaped with its upper bight portion encircling the bumper head and upper ends of the compression members. The legs of the tension bar diverge downwardly, outwardly and forwardly and their lower ends are secured to the tension cross member 26 in a manner to be described hereinafter in detail. The bumper head 12 itself may take various forms. For example, it may be of the type shown in Patent No. 2,596,240—Hayes. The tension bar and compression members may likewise be constructed as disclosed in said patent. Accordingly, the bar 24 is shown as being made from a single length of bar stock while the compression members are made of substantially H beam sections. The tension and compression units are detachably secured preferably as disclosed in the aforesaid Patent No. 2,596,240. The securing means may include a nut 28 as shown in FIG. 3.

The compression unit will now be described with particular reference to FIGS. 1, 2, 3 and 8 to 10, particularly FIGS. 8 and 9. As already indicated, the compression unit includes the compression members 16 and the compression cross member 20. The latter is preferably of channel section and it is seated upon and extends transversely somewhat beyond the rails 14. It also spans the auxiliary strengthening and supporting rails 30 located between the main rails 14. The lower end of each compression member is cut at an angle and with a slot 32 so as to seat upon the vertically spaced horizontal portions of the channel member 20, which portions are indicated by the reference characters 20–1 and 20–2 in FIG. 9 only, to provide a compression joint structure. There are two such joint structures but only one will be described, the corresponding parts of the other being indicated by like reference characters.

The channel 20 and compression members 16 are securely welded to each other to provide an extremely strong and rugged construction. Additional strength and rigidity is provided by a vertical plate 34 welded to the upper side of the upper horizontal portion 20–1 of the channel ijn abutting relation with the upper portion of the compression member. Similarly, an additional horizontal supporting plate 36 constituting, in effect, a short extension of the lower horizontal portion 20–2 of the channel member is welded both to the channel member and to the underside of the compression member. This plate 36 rests upon the rail head as does the channel member 20. The plate 36 is also utilized for the purpose of securing in plac a generally cross-shaped spider 40 to which greater reference will be had hereinafter. It will be observed that two of the compression joints, such as described, and corresponding parts of each, are indicated by like reference characters.

The tension joint structures will now be described with particular reference to the left joint structure and to FIGS. 1, 3, 4, 5 and 6. The tension cross member 26 is also preferably of channel section but it is made of three pieces 26–1, 26–2 and 26–3 of which the piece 26–2 is a central one and located between the lower extremities of the tension bar 24. The three parts are welded to the spaced lower ends of the tension bar thereby to provide a construction in which the tension bar is very rigidly and adequately secured to the tension cross member.

The previously mentioned spider 40 preferably takes the form of a cross brace including a central plate 42 from which four legs 44 extend diagonally to the compression and tension joints. Longitudinal supports 45 are located at each side to connect aligned tension and compression joint structures and thus to provide additional strength. The spider serves to prevent movement of the lower ends of the compression and tension units relative to each other during operation, thereby insuring uniform movement thereof to prevent buckling of the post. The spider is connected to the joints by bolting to the small plates 46 welded to the joint structures as best illustrated in FIGS. 4, 8 and 9.

In accordance with the present invention, the bumping post is slidably mounted upon the rails and provided with impact transmitting structure extending below the bases of the rails into abutting engagement with the ties and thus with the ballast to provide a cushioned stop of the car. As already indicated, the bumping post is supported by the cross members 20 and 26 resting on rails. Associated with these are additional holding and guiding and thrust transmitting means, those associated with the compression unit being indicated by the reference characters 52 and those with the tension unit being indicated by the reference characters 54. These will now be individually described.

Each of the compression holding and guiding and thrust means 52 comprises a plate 56 seated upon the top of the rail head and welded to the rear of channel 20; a rail encircling loop 58 secured to the plate 56 and located so as to abut against a cross tie and a pair of vertically disposed plates 60 welded to the undersides of the plate 56 and channel 20 and located immediately forward of the vertical portions of the loop 58. Only the lower ends of the plates engaged the loops, the upper ends being spaced away from the loops, thereby more effectively to maintain the loop vertical and to facilitate assembly of the post on the track. Maintenance of the loops 58 in vertical position insures that they will not bind and that the bumping post will slide along the rail under car impact. The vertical portions of the loops are indicated by the reference characters 58–1. The transverse or bight portions engaged by plates 60 are located underneath the base of the rail and are indicated by the reference characters 58–2 (as best illustrated in FIG. 7) and the loops are secured in place by the bolts 62 threaded on the upper projecting threaded ends of the vertical portions 58–1. The bolts 62 are tightened fairly reasonably but not so tightly as to prevent sliding movement of the bumping post. It should be noted also that the loop structures 58 and the dependent brace plates 60 engage the rail base thereby effectively to maintain the bumping post centered upon the rails and effectively to guide the post as it moves along the rail under car impact.

Each of the tension holding and guiding and thrust transmitting structures 54 also includes a horizontal plate 66 welded to the front edge of the tension cross members, a loop structure 68 and the dependent loop engaging plates 70 welded to the underside of plate 66. These structures are like those described in connection with the compression members and further detailed description will not be given.

Additional holding and guiding structures 72 are mounted on the tension unit for association with the auxiliary rails 30. Referring now particularly to FIGS. 3, 5 and 6, it will be noted that each of the structures 72 includes a supporting plate 74 welded near the upper side of the tension cross member 26, a pair of vertically movable rail head embracing elements 76 comprising upper threaded portions 76–1 extending through apertures in plate 74 and lower rail head encircling portions 76–2, and generally right-angled brackets 78 welded to the front of the cross member 26 and engaging the lower portions 76–2 to prevent binding thereof upon the rail head when the bumping post is moved under car impact. The members 76 are secured in adjusted position by the bolts 80, the adjustment being such that the elements 76 engage the sides and underside of the rail head to provide a good guiding action for longitudinal movement of the bumping post along the rails.

From the foregoing description of the present invention, it may be noted that the bumping post can be constructed and assembled economically. The construction is such that the bumping post can be installed at any suitable place along the rails. It is not necessary that it be slid on from the end of the rails; likewise no drilling of the rails is necessary because the bumping post is slidably mounted upon the rails.

Once installed, the bumping post is ready for operation. When it is struck by a railroad car or locomotive, the force of the impact is transmitted by both the compression and tension units to the ties and ballast. There is no effective transmission of the impact force to the rails as in prior types of bumping posts which are bolted or otherwise fixedly secured to the rails. The location of the thrust transmitting structure in engagement with the ties results in full use of the compressibility of wood to provide some of the stopping action. Also, it has been found in operation that the ties may move a considerable distance under unusual impacts, the ties displacing the ballast in front of them as they moves underneath the rails. There is thus provided an effective action, the action taking place over an extended distance as well as time.

The spider 40 ties the joint structures together so that they move uniformly, thereby to prevent buckling which might occur if the joint structures moved at different rates.

Also, the thrust is taken up in two parts at the compression and tension units. This provides a more effective stopping action and the stopping action is increased by utilizing several ties as indicated particularly in FIGS. 1, 2 and 2 where a number of ties are effectively tied together at both the compression and tension units through the use of the anchor rods 84 located at the opposite outer sides of the rails 14. It is also better to use about six ties with the tension unit as compared with three with the compression unit. This arrangement assists in obtaining proper movement of the tension unit with the compression unit.

A second embodiment of the bumping post of the present invention will now be described in detail in connection with FIGS. 11 to 20, inclusive. It, like the first described embodiment, is intended slidably to be mounted upon the rails but it can readily be converted into a fixed unit. It is characterized by a somewhat different construction of the compression and tension cross members and joints and of the holding and guiding and thrust transmitting structures. Referring now first to FIGS. 11, 12 and 14, it will be noted that the bumping post as a whole is indicated by the reference character 100. It includes a compression unit 102 comprising the divergent compression members 104 at the upper end of which are supported the bumper head 106 and the lower ends of which are connected to the transversely extending compression cross member 108, and a tension unit including the generally V-shaped tension bar 112, the lower end of which is secured to the tension cross member 114 and the upper end of which is detachably secured to the compression unit by the nut 115.

The tension cross member 114 is also of channel section. It is provided with spaced vertical slots 170 on its vertically extending flange through which the ends of the tension bar project slightly so as to enable the two to be welded together. The bumping post also includes a spider 116 like the spider 40 of the first described embodiment.

Referring now more particularly to FIGS. 11 to 14, the compression unit will be considered in further detail. It will be noted first that the compression cross member 108 is of right angle section. This construction facilitates the connection of the compression cross member to the compression members 104. All that is necessary is that the lower ends of the compression members be cut at a right angle at proper slant thereby to assure a proper fit between the inside of the channel member 108 and the lower ends of the compression members. Thereafter, the two can be welded readily to form a rigid and substantial structure. The compression guiding, holding and thrust transmitting structures are indicated generally by the reference characters 120. Each comprises a flat, fairly heavy horizontal plate 122 seated upon the head of rail 14 and welded immediately to the rear of the compression cross member 108; a rail encircling loop structure 124 and a pair of loop backing plates 126 welded to the underside of the cross member and maintaining the loop in its vertical non-binding position.

In accordance with a feature of the second embodiment of the invention, the loop structures 124 are so constructed and arranged that the bumping post may be converted from a movable to one that is relatively rigidly and fixedly supported on the rails. To accomplish this, the backing plates 126 would either not be used or would be removed thereby to leave the loop structures unbacked, with the result that they could move somewhat angularly so that the bight portions 124–1 would engage the rail. The loop structures 124 include not only the bight portion 124–1 but the vertically disposed portions 124–2 (see FIG. 20), the upper ends of which are threaded for the reception of the securing nuts 128. Adjustably or movably to support the loop structures, there is provided a pivot support taking the form of a rod or shaft 130 which is apertured at its ends for the passage of the threaded portions of the loop structure. The upper sides of the shaft are flattened as indicated by the reference character 132, see particularly FIGS. 13 and 20, to provide a good seat for the securing nuts 128. The shaft 130 is mounted upon an arcuate seat provided by a curved plate 134 located between the vertical portions of the loop structure and welded to the upper side of plate 122 through the intermediary of the spacing and locating bars 136 and 138 adjacent the upper ends of plate 122 to which they are also welded. The construction of the plate 134 is better shown in FIG. 19 which illustrates a cross section through the tension holding, guiding and thrust transmitting structure which will now be described.

Referring now more particularly to FIGS. 14 to 19, it will be noted that the tension guiding, holding and thrust transmitting structures are indicated generally by the reference characters 140. These structures are generally like the earlier described compression structures and they include the loops 124, the pivotally movable shaft 130 mounted upon the arcuate plate 134 and the loop engaging plates 126. The latter are secured to the undersides of the main supporting plate 142 which is welded to the front of tension cross member 114. Additional strength and rigidity is given to the structure by the rectangular side plates 144 welded to the underside of the cross member 114 and plate 142 and to the sides of the braces 126. In this embodiment of the invention, the vertical side portions 124–2 of the loops do not engage the sides of the rail base although they are relatively close to it so that they can move when the plates 126 are removed thereby to bind with the rail and provide a fixed bumping post. Additional guiding relative to the rail head is provided, as best illustrated in FIG. 15, by the short rods 146 welded underneath plate 142, and also under plate 122 if desired.

Means are also associated with the tension unit to center and hold the stop relative to the auxiliary rails 30. these means indicated as a whole by reference characters 150 (see FIG. 15) each comprises a pair of bifurcated clamp members 152 mounted on studs or pins 154 so as to be rotatable to effect engagement of a lower bifurcation 156 with the underside of a rail head. The desired adjustment is effected by moving a vertically movable cam member 158 relative to the upper bifurcation 160. The cam member 158 is provided with a vertical slot 162 so that it may be moved relative to a threaded stud 164 relative to which it is secured in adjusted position by the nut 166. This adjustment is such as to enable the bumping post to move along the rail under car impact.

It is believed that the construction and operation of this embodiment is apparent from the foregoing description. In general, the operation is the same as with the first described embodiment when the braces 126 are used and the loops are adjusted so as to enable the bumping post to move along the rails under car impact. However, to transform the post into a rigid one, all that is necessary is to remove or not use the braces 126. In this event the loops 124 will move about the pivot axis of the pivot shaft 130 so as to effect binding between the underside of the rail and the bight 124–1 of the loop. It will thus be apparent that the bumping post of this embodiment can be used either as a cushion type bumping post or as a rigid one.

A third embodiment of the invention will now be described in connection with FIGS. 21 to 34, inclusive. This embodiment differs from those previously described in that the bumping post is movably mounted upon a single pair of rails, i.e., the main track rails by means supported upon and slidably engaging only the rail head and in that it includes a simplified structure extending downwardly below the base of the rail to engage the ties and ballast thereby to provide the desired cushion stop of a moving car.

The bumping post as a whole is indicated by the reference character 200. It includes a compression unit 202 and a tension unit 204. The compression unit includes the divergent compression members 206, a compression cross member 208 connecting the lower ends of the member and seated upon the rails 14 and a bumper head 210. The tension unit includes the tension bar 212 and the tension cross member 214, also seated upon the rails 14. As in the case of the previous embodiments, the two sections are detachably united by means including a nut 216. The lower ends of the tension and compression members are joined, also, by the spider indicated as a whole by reference character 218.

The presently described embodiment of the invention includes a different type of compression cross member and compression joint construction. In this embodiment, the compression cross member 208 is made of three sections united together as by welding. These sections are indicated by the reference characters 220 and 222. The section 220 is the central one and it consists of a piece of right angle section located with the horizontal flange down and with the vertical flange at the rear, so to speak. The end sections 222 are each made of two parts, one of which is a horizontally disposed plate 226 having a length such as to project a short distance beyond the rails 14 and the other of which is a plate 228 that is somewhat triangular in shape and secured in vertical position at the rear of plate 226. The plates 226 and 228 are relatively heavy and are both welded to each other and to the lower extremities of the compression members 206.

The force of the impact from the compression unit is transmitted to the rail supporting ties and ballast by the dependent thrust transmitting members 230, each of which is of generally triangular shape and welded to the underside of plate 226. The members 230 are mounted relatively near the inner sides of the rails 14 and substantially underneath the lower ends of the compression members 206.

The tension cross member 214 is also of composite construction. It includes a central section 234 of right angle section. The horizontal flange of section 234 faces toward the front and the vertical section is at the rear and extends downwardly. The tension member also includes the end portions 240 which extend a short distance beyond the rails 14. Each of the end portions includes a horizontal plate 236 to the upper and rear side of which are welded the generally triangular plates 240 and 242, the opposed faces of which are spaced a short distance apart in order to receive the lower ends of the tension bar 212 as best illustrated in FIG. 30 to 33, inclusive. From these figures it will be noted that the lower ends 244 of the tension bar are configured to seat directly upon the upper surface of plates 236 to which they are also welded, thereby to provide an extremely strong and rugged construction.

The force of the impact is transmitted from the tension unit to the ties and ballast through the dependent plates 246 welded to the undersides of plates 236 in much the same manner as the plates 230 are welded to the undersides of plates 226.

In accordance with the present invention, the bumping post is slidably mounted upon the rails by holding and guiding means taking the form of the rail head clamping means 250. There are four of these, one located at each of the four corners of the post. Each of the rail head clamping means 250 comprises two bolts 252, one at each side of the rail head (see particularly FIGS. 28–30). Each of the bolts is provided with a head 254 having a beveled upper surface 256 engaging the adjacent underside of the rail head. The upper ends of the bolts extend above the plate 236 through apertures 258 therein. The bolts are drawn up fairly tightly against the rail head by the nuts 260 although the adjustment of the bolts is such as to enable the bumping post relatively readily to slide along the rails. The bolts are held in vertical position to prevent binding by the short sections of channel indicated by the reference characters 262 encircling the bolt heads. The sections 262 are welded to the undersides of the plate 236 and the inner one may also be welded to the immediately adjacent dependent thrust transmitting element 246.

All four of the rail head clamping means are the same in construction so only one has been described and like reference characters have been used to indicate the others.

From the foregoing detailed description of the present invention, it is important that the bumping post of this embodiment may also be constructed and installed readily. There is provided an extremely rugged construction and the construction is facilitated by manufacture of the transverse cross pieces and three sections, of which the outer ones are relatively heavy and secured to the lower ends of the compression and tension members respectively. Installation is also facilitated by the use of the rail head clamping means which also provide and insure good sliding of the bumping post under car impact. As in the previously described embodiments, the force of the impact is divided among numerous ties through the use of the anchor bars 84. Tht amount of the impact to be transmitted to the ballast or road bed may also be controlled by varying the length of the anchor bars. As shown in FIG. 21, three ties are connected to the tension anchor bars and six to the compression ones.

Referring now to FIG. 35, there is illustrated a further embodiment of the invention. This embodiment, while shown only fragmentarily, utilizes the rail 14 and an auxiliary rail 30 with which is associated rail head clamping means also indicated by tht reference character 250B which is like the rail head clamping means 250A associated with rail 14. This construction provides even more rigidity and strength than the use of a single rail head clamping means at each of the tension joints.

Referring now to FIGS. 36 to 41, inclusive, these show details of a further embodiment of the invention in which the compression and tension units are mounted and supported for longitudinal movement by the rail base flanges of the rails. The entire bumping post has not been shown but the post can be constructed generally as described above and may include a tension unit having a unitary tension bar 300 similar to the tension bars previously described and a compression unit having compression members 302 also like those previously described. The tension and compression members may be united as described heretofore and support a bumper head, not shown.

Details of the tension unit and the manner in which it is supported by the base flange of a rail are illustrated in FIGS. 36 to 38, to which reference is now had, and these disclosing a left tension joint and associated guiding and holding structure. The lower end of the tension bar is mounted upon a tension cross member 304 of composite construction and of which the central portion 306 and the left hand portion 308 only have been shown. These two sections are united to the lower end of the tension bar as by welding. The portions of the tension cross member are preferably of channel section.

Each of the tension joints has associated with it a guiding and holding means in the form of the clamping means indicated as a whole by reference character 310. Inasmuch as only one has been illustrated, it alone will be described. It includes a first or base plate member 312 closely underlying the rail base and projecting somewhat to both sides of the rail and secured as by welding to the front of the tension cross member and lower end of the tension bar. It is notched as indicated by the reference character 314 to provide a complementary fit with the tension bar. The clamping means includes also upper plate members 316 overlying the projecting portions of plate 312 and having contact with limited portions of the inclined upper portions 14a of the rail base flange at a distance from the web. This limited contact is provided as by the spaced beads 318 of hardened weld material disposed on the inner undersides of the upper plates 316. In order to facilitate movement of the bumping post along the rails under car impact, the plates 316 are maintained in generally parallel relationship to the under plate 312. This relationship is provided by welding or otherwise securing shafts 320 to the outer undersides of the upper plates 316.

The plates of the clamping means are drawn together by vertical bolts 322 projecting through aligned apertures in the base and upper plates. The bolt heads 324 are disposed at the underside of plates 312 and the nuts 326 are located at the upper sides of plates 316. The nuts are maintained in adjusted position by the lock washers 328.

In order to prevent binding action of the clamping means and turning of the bolt, the bolt head 324 is held from rotating by an encircling structure 330 welded to the underside of plate 312. The upper clamping plates 316 are also prevented from moving by a plurality of bars 332, 334 and 336 engageable with the edges of the plates and welded to the plate 312.

Additional rigidity and strength to the holding and guiding structure is provided by the generally triangular brackets 338 welded to the underside of plate 36 and to the front of the tension cross member.

As in the previously described embodiments of the invention the thrust of impact is transmitted to the ties and ballast. In the presently described embodiment of the invention the thrust is transmitted to the ties at the tension unit by the thrust transmitting members 340 welded to the interior of the channel portion of the tension cross member 308, as best illustrated in FIG. 36. The thrust transmitting member may be generally U-shaped and disposed with its bight portion 342 in abutting relation to the tie.

The compression joints and associated holding, guiding and thrust transmitting structures will now be described in connection with FIGS. 39 to 41. It may be noted first from FIGS. 39 and 40 that there is illustrated an auxiliary rail 342 not shown in the previously described figures of this embodiment. However, there are two such rails, as utilized also in the first two embodiments of the present invention. These rails, like the main rails 14, overlie the cross members of both the tension and cross members and one or both of the cross members may have rail encircling clips 344 secured thereto as shown in connection with the compression cross member 346, see FIGS. 39 and 40.

The compression unit includes the divergent compression members 302 of which only one has been illustrated and the compression cross member 346.

The compression unit is movably mounted upon the track rails 12 by holding and guiding means in the form of flat clamp joints or connections 350 each of which includes a plate 352 carried at the lower end of the compression member 302 and a base plate 354 which underlies the track rail 14 and is welded to the rear face of the compression cross member 346 with its upper surface flush with the outer surface of the top flange of the channel shaped compression cross member. The clamping plate 352 is welded to a cap plate 356 welded to the lower end of the compression member and is thus maintained parallel to the base plate. The plates 352 and 356 are generally trapezoidal in shape and are welded to each other near their adjacent edges. Added strength and riigdity is given to the structure by a pair of triangular load transmitting plates 358 and 360 which are welded to the outer and upper faces respectively, of the base or cap plate 356 and the clamping plate 352. The plates 358 and 360 are positioned along the parallel edges of the plates 356 and 352. The clamping plate 352 is provided with a pair of spaced weld beads 362 on its underside to provide limited engagement of the clamping member with the under inclined surface 14a of the rail base flange. Triangular braces 363 are welded to the front of cross member 346 and the underside of plate 354.

The clamping means 350 includes also a second clamping plate 364 also provided with the weld beads 362 at its inner underside. It is provided with a shaft portion 365 at its outer underside whereby it is maintained in parallel relationship to the base plate 354. The upper plates 352 and 364 are secured relative to the base plate by the bolts 366 having their heads located below the base plate and encircled by the rotation preventing means 368 welded to the undersides of the base plate. As in the tension clamping means, the clamping plates are tightened by the nuts 370 which are held in adjusted position by the lock washers 372.

The plate 364 is prevented from rotating by the bars 374, 376 and 378 associated with the edges of the clamping plate and welded to the base plate 354 and to the upper surface of the compression cross member. The clamping plate 352 is prevented from being rotated by being secured to the compression member.

The thrust transmitting means associated with the compression joint structure includes the member 380 which is of generally U-shape and has its bight portion abutting against the tie as illustrated best in FIG. 39. The member 380 is welded to the front of the compression cross member and to the underside of the base plate. Its bight portion 382 extends forwardly of the remainder of the structure.

From the foregoing detailed description of the present invention it is apparent that this embodiment of the bumping post can be readily constructed and installed on the track. Once it is installed on the track it functions in the same manner as the previously described embodiments to provide a cushion stop of a car running into the bumping post. It may be provided with a spider and anchor bars the same as the other embodiments.

The modification of the invention illustrated in FIGS. 42 and 43 will now be described. It utilizes compression and tension unit structures similar to those of the embodiment of FIGS. 22 to 34 with holding and guiding means similar to that of the embodiment of FIGS. 1 to 10. In view of the similarity to these earlier described embodiments, the complete bumping post has not been shown.

The bumping post includes compression and tension units 400 and 402 of which only the left compression and tension joint structures and associated parts have been shown. The compression unit includes the compression members 404 of H-section, only one of which has been shown, supporting a bumper head, also not shown. The unit includes also a compression cross member 406 including a central portion 408 and end portions 410 like those constituting compression cross member 208 previously described. Thus, the end portion includes a vertical plate 412 at the front side of plate 410 so that the lower end of the compression member can be abutted against and welded to both.

Rail encircling clamping means comprising the loop structures 414, like the loop structures 58 of the embodiment of FIGS. 1 to 10, are secured to the end portions of the compression cross piece. This is done through plates 416 straddling the rails and secured to the front of the end portions of the cross member and apertured for the passage of the leg portions of the loop structures. The loop structures are tightened so as to enable the post to move under car impact and are prevented from binding by the vertically disposed brace plates 418 welded to the undersides of plates 410 and 416 so as to maintain the loop structures in vertical position. The force of impact, as before, is transmitted to the rail supporting ties and ballast, not shown, through the joint structures and the loops, which are abutted against a tie.

The tension unit 402 includes a tension bar 420 and a tension cross member 422 constructed similarly to the cross member 214 previously described. As shown, the cross member includes the central portion 424 and the end plates 426 (only one being shown). Each lower end of the tension bar is abutted against the upper side of plate 422 and welded to it and the adjoining vertical plates 428 and 430. The rail straddling portions are widened to provide space for the rail encircling loop structures 432 and their associated brace plates 434, which maintain the loops in non-binding vertical position.

This last described embodiment of the present invention can also be readily constructed and installed with the spider and anchoring structures, which have not been shown. It includes the rugged cross member structures of the embodiment of FIGS. 22 to 34 and the rail encircling holding and guiding means of the embodiment of FIGS. 1 to 10. The post, like those previously described, is movably mounted on the rails and transmits the force of car stopping impact to the rails and ballast to provide an effective cushioned stop of the car.

While the present invention has been described in connection with the details of several embodiments, it should be understood that these details are not intended to be limitative of the invention except insofar as set forth in the accompanying claims.

Having thus described my invention, what I desire to secure by United States Letters Patent is as follows:

1. A bumping post for installation on spaced apart rails supported on ties, including in combination, a bumper head, bumper head supporting tension and compression members diverging downwardly and outwardly and forwardly and rearwardly, respectively, from the bumper head to points adjacent the rails spaced opposite each other in front of and to the rear of the bumper head, means for movably supporting said members on said rails including individual rail engaging holding and guiding means secured to the lower ends of each of said tension and compression members and movably supported by the rails, and individual structures secured to the lower ends of each of both the tension and compression members and disposed below the bases of the rails for engagement with the rail supporting ties and ballast for transmitting the force of impact to the ties and ballast.

2. A bumping post for installation on spaced apart rails supported on ties, including in combination, a bumper head, bumper head supporting tension and compression members diverging downwardly and outwardly and forwardly and rearwardly, respectively, from the bumper head to points adjacent the rails spaced opposite each other in front of and to the rear of the bumper head, means supporting said members for longitudinal movement on said rails including unitary tension and compression cross member structures rigidly secured to the lower ends of said tension and compression members, respectively, extending across the rails and beyond the outer sides of the rails, and rail engaging holding and guiding means slidably mounted relative to the rails and secured to said cross member structures at the lower ends of each of said tension and compression members, and impact transmitting structures secured to both the tension and compression members and cross member structures for engagement with the rail supporting ties for transmitting the forces of impact to the ties and ballast.

3. A bumping post for installation on spaced apart rails supported on ties, including in combination, a bumper head, bumper head supporting divergent compression and tension members diverging downwardly, outwardly, forwardly and rearwardly, respectively, to points adjacent the rails spaced opposite each other and to the rear of the bumper head, holding and guiding structures secured to said members and engaging the rails and movably supporting the post for movement on the rails under car impact, and thrust transmitting structures secured to said members and extending below the bases of the rails into engagement with the rail supporting cross ties for transmitting the force of impact to the ties and ballast.

4. A bumping post for installation on spaced apart rails supported on ties, including in combination, a bumper head, bumper head supporting divergent compression and tension members diverging downwardly, outwardly, forwardly and rearwardly, respectively, to points adjacent the rails spaced opposite each other and to the rear of the bumper head means including compression and tension cross members supported on the rail heads interconnecting the lower ends of said compression and tension members, holding and guiding structures secured to said cross members and slidably clamped to the rail heads movably supporting the post for movement along the rails under car impact, and thrust transmitting structures secured to said cross members and extending below the bases of the rails into engagement with the rail supporting cross ties for transmitting the force of impact to the ties and ballast.

5. A bumping post as claimed in claim 4, wherein said thrust transmitting structures are each constituted by a single dependent plate member secured to the underside of a cross member near the inside of the rail at the lower end of each of the compression and tension members.

6. A bumping post as claimed in claim 4, wherein said holding and guiding and thrust transmitting structures are secured to the undersides of said cross members.

7. A bumping post tension unit, including in combination forwardly, downwardly and outwardly extending tension members and a cross member secured to the lower ends of said tension members and constructed to seat upon spaced apart rail heads, said cross member comprising a central part of right angle section having one flange horizontally disposed, and end portions defined by horizontal plates extending from said horizontal flange, the lower ends of said tension members abutting against and being secured to the upper side of said plate, and generally triangular brace plates secured to the opposite lower sides of each of said tension members and to the upper side of said horizontal plates, and said horizontal plates extending outwardly beyond the lower ends of said tension members and being apertured to receive rail clamping means.

8. A bumping post compression unit, including in combination, rearwardly, downwardly and outwardly extending compression members and a cross member secured to the lower ends of said compression members and constructed to seat on the heads of spaced apart rails, said cross member comprising a central part of right angle section having one flange horizontally disposed, end portions defined by horizontal plates extending from said horizontal flange and vertical plates at the rear of said horizontal plates, the lower ends of said compression members abutting against and secured to both said plates, said horizontal plates extending outwardly beyond the lower ends of said compression members, and rail clamping means secured to and depending downwardly from each of said plates.

9. A bumping post tension unit, including in combination forwardly, downwardly and outwardly extending tension members and a cross member secured to the lower ends of said tension members and constructed to seat upon spaced apart rail heads, said cross member comprising a central part of right angle section having one flange horizontally disposed, and end portions defined by horizontal plates extending from said horizontal flange, the lower ends of said tension members abutting against and being secured to the upper side of said plates, and generally triangular brace plates secured to the opposite lower sides of each of said tension members and to the upper sides of said horizontal plates, and said horizontal plates extending outwardly beyond the lower ends of said tension members and being apertured at opposite sides of the rail head, and rail head clamping means extending through the apertures in and mounted upon said plates.

10. A bumping post compression unit, including in combination, rearwardly, downwardly and outwardly extending compression members and a cross member secured to the lower ends of said compression members and constructed to seat on the heads of spaced apart rails, said cross member comprising a central part of right angle section having one flange horizontally disposed, end portions defined by horizontal plates extending from said horizontal flange and vertical plates at the rear of said horizontal plates, the lower ends of said compression members abutting against and secured to both said plates, said horizontal plates extending outwardly beyond the lower ends of said compression members and being apertured at opposite sides of the rail head, and rail head clamping means extending downwardly from each of said plates through said apertures.

11. A bumping post as claimed in claim 2 wherein plates are secured to said cross members where they extend transversely across the rails and said rail engaging holding and guiding means are adjustably secured to said plates.

12. A bumping post as claimed in claim 11 wherein said cross members and plates extend across the tops of the rails.

13. A bumping post as claimed in claim 2 wherein said rail engaging holding and guiding means include plates overlying the rails and secured to the cross members and rail encircling loop structures depending from said plates and adapted to abut against the rail supporting cross ties and backing plates abutting the rear sides of said loop structures to prevent them from binding on the rails as the post is moved under car impact.

14. A bumping post as claimed in claim 2 wherein said rail engaging holding and guiding means include loop structures encircling the rails and adapted to abut against the rail supporting cross ties, backing plates abutting the rear sides of said loop structures to prevent pivotal movement thereof when the car is moved under impact, and pivotal means supporting said loop structures.

15. A bumping post as claimed in claim 2 wherein said tension and compression cross member structures underlie the track rails and said holding and guiding means each include clamping plates each overlying an associated structure and having a portion adapted to overlie and having engagement with a limited portion of an upper sloping face of a track rail base flange, and means for holding said clamping plates and cross member structures in sliding engagement with the track rail flanges.

16. A bumping post as claimed in claim 2 in which the compression cross member is of channel section and arranged with its inner side facing forwardly toward said compression members, and said compression members are seated upon and secured to the lower side and abut against and are secured to the bottom of the channel shaped member and are also slotted to receive the upper side of the channel shaped member.

17. A bumping post as claimed in claim 2 wherein said compression cross member is constituted by a member of right angle section arranged with one flange vertical and the other horizontal, the latter being at the bottom of the member and facing forwardly, and the lower ends of said compression members are cut to abut against and secured to the upper and front sides, respectively, of the horizontal and vertical flanges of said cross member.

18. A bumping post as claimed in claim 2 wherein said tension cross member is a member of right angle section and arranged with one flange vertical and the other horizontal and extending rearwardly from the bottom of said flange, and said vertical flange is slotted to receive the lower portions of said tension member, the latter also abutting against and being secured to the horizontal flange.

References Cited in the file of this patent

UNITED STATES PATENTS

| | | |
|---|---|---|
| 579,667 | Wilhelmsen | Mar. 30, 1897 |
| 1,112,476 | Rawie | Oct. 6, 1914 |
| 1,204,189 | Rawie | Nov. 7, 1916 |
| 1,518,453 | Rawie | Dec. 9, 1924 |
| 1,621,708 | Breyley | Mar. 22, 1927 |
| 1,629,124 | Shultz | May 17, 1927 |
| 1,648,012 | Breyley | Nov. 8, 1927 |
| 1,745,014 | Isono | Jan. 28, 1930 |
| 1,746,007 | Miller | Feb. 4, 1930 |
| 1,747,006 | Hayes | Feb. 11, 1930 |
| 2,019,135 | Jaeger | Oct. 29, 1935 |
| 2,053,556 | Hayes | Sept. 8, 1936 |
| 2,164,404 | Hayes | July 4, 1939 |
| 2,308,877 | Hayes | Jan. 19, 1943 |
| 2,318,940 | Hayes | May 11, 1943 |
| 2,359,106 | Hayes | Sept. 26, 1944 |
| 2,441,193 | Hayes | May 11, 1948 |
| 2,737,125 | Hayes | Mar. 6, 1956 |

FOREIGN PATENTS

| | | |
|---|---|---|
| 238,020 | Germany | Sept. 16, 1911 |
| 330,140 | Germany | Dec. 8, 1920 |
| 389,756 | Germany | Feb. 13, 1924 |
| 816,559 | Germany | Oct. 29, 1951 |
| 376,623 | Great Britain | July 14, 1932 |